(12) United States Patent
Juskaitis et al.

(10) Patent No.: US 7,476,831 B2
(45) Date of Patent: Jan. 13, 2009

(54) MICROSCOPIC IMAGING SYSTEM HAVING AN OPTICAL CORRECTING ELEMENT

(75) Inventors: Rimvydas Juskaitis, Cuttleslowe (GB); Mark Neil, Botley (GB); Tony Wilson, Oxford (GB)

(73) Assignee: Isis Innovation Limited, Oxford (GB)

( * ) Notice: Subject to any disclaimer, the term of this patent is extended or adjusted under 35 U.S.C. 154(b) by 55 days.

(21) Appl. No.: 10/546,845

(22) PCT Filed: Jan. 8, 2004

(86) PCT No.: PCT/GB2004/000022

§ 371 (c)(1), (2), (4) Date: Jun. 30, 2006

(87) PCT Pub. No.: WO2004/077122

PCT Pub. Date: Sep. 10, 2004

(65) Prior Publication Data

US 2007/0002434 A1    Jan. 4, 2007

(30) Foreign Application Priority Data

Feb. 27, 2003    (GB) ................... 0304568.9

(51) Int. Cl.
G02B 21/00    (2006.01)
(52) U.S. Cl. .................. 250/201.3; 250/208.1; 359/368
(58) Field of Classification Search ... 250/201.3–201.5; 359/368
See application file for complete search history.

(56) References Cited

U.S. PATENT DOCUMENTS

| 4,128,304 | A |  | 12/1978 | Sussman |
| 5,161,052 | A |  | 11/1992 | Hill |
| 5,496,993 | A |  | 3/1996 | Kasuga |
| 5,537,247 | A | * | 7/1996 | Xiao ........................ 359/368 |
| 5,847,400 | A |  | 12/1998 | Kain et al. |
| 6,043,932 | A |  | 3/2000 | Kusunose |
| 6,188,514 | B1 |  | 2/2001 | Saito et al. |
| 6,195,202 | B1 | * | 2/2001 | Kusunose ................ 359/368 |
| 6,337,472 | B1 |  | 1/2002 | Garner et al. |
| 2002/0067463 | A1 |  | 6/2002 | Obara |
| 2002/0109101 | A1 |  | 8/2002 | Hoffmann |

FOREIGN PATENT DOCUMENTS

| EP | 0 176 358 A2 | 4/1986 |
| JP | 7-221944 | 8/1995 |
| WO | WO 01/84209 | 11/2001 |
| WO | WO 02/01934 A2 | 1/2002 |
| WO | WO 02/47130 | 6/2002 |

OTHER PUBLICATIONS

International Search Report dated May 13, 2004.
Great Britain Search Report dated Jul. 11, 2003.

* cited by examiner

*Primary Examiner*—Georgia Y Epps
*Assistant Examiner*—Tony Ko
(74) *Attorney, Agent, or Firm*—Knobbe, Martens, Olson & Bear LLP

(57) ABSTRACT

A microscopic imaging system includes a receiving means (2) for receiving an article (4) to be imaged, a linear optical detector (16), focussing means (10) for focussing an image of an article in the receiving means onto the detector, scanning means (6) for producing relative movement between the image and the detector in a direction substantially perpendicular to the axis of the detector, and an optical correcting element (14) for reducing aberrations in the image focussed onto the detector.

21 Claims, 5 Drawing Sheets

MICROSCOPIC IMAGING SYSTEM HAVING AN OPTICAL CORRECTING ELEMENT

This application is the U.S. National Phase under 35 U.S.C. § 371 of International Application PCT/GB2004/000022, filed Jan. 8, 2004, which claims priority of GB 0304568.9, filed Feb. 27, 2003.

The present invention relates to a microscopic imaging system and in particular but not exclusively to a system for acquiring images at microscopic resolutions of articles having areas greater than approximately 1 cm$^2$, and which allows images to be stored, distributed and viewed.

One application of such an imaging system is in the field of pathology, for acquiring images of entire standard pathology slides at microscopic resolutions. Pathology slides typically have dimensions of approximately 2 cm×4 cm and are viewed for diagnostic purposes at a resolution of approximately 1 μm. In a conventional clinical pathology environment, prepared tissue samples mounted on microscope slides are viewed by the pathologist using a normal optical microscope. When viewing the sample, the pathologist repeatedly switches between a low magnification, wide field view of the whole sample, and a high magnification, narrow field view of selected portions of the sample. The pathologist then makes a diagnosis on the basis of these observations. A report is then written up (which typically does not include any images), and the slide is then archived for long term storage, should it be required for future diagnostic reference.

This process has a number of inherent disadvantages. The process of observing the slide repeatedly at high and low magnifications is highly skilled and very time-consuming. It also requires that the pathologist has physical access to the specimen, which prevents remote diagnosis and/or seeking a second opinion from another pathologist who does not have access to the specimen. Furthermore, the tissue sample will degrade over a period of time, reducing its value.

Although it is possible to capture the microscopic images, for example by using a camera attached to the microscope, the camera captures only the instantaneous field of view of the microscope. This may be either a low magnification, wide field view of the entire sample, or a series of higher magnification, narrow field views of selected portions of the sample. If these images are captured electronically, they can be distributed to third parties.

However, the third party can view only the images that are supplied and is unable to select other portions of the sample for viewing at high magnifications.

One way of addressing this problem is to build up an image of the entire sample by acquiring a series of images at high magnification and then merging those separate images together by a process of tessellation. However, there are a number of serious problems associated with this approach, including the fact that distortions are inevitably present in the highly magnified images, which makes tessellation difficult, and the sample has to be scanned in two directions, with the result that it is inevitably rather slow.

An alternative approach described in International Patent Application WO 01/84209 uses a line-scan camera with a microscope objective lens to build up an image of an entire microscope sample by scanning the sample in a series of strips and then composing the image strips into a single contiguous digital image. Each of the strips is relatively narrow, having a width of less than 1.5 mm and between 10 and 20 image strips therefore have to be assembled to build up an image of the entire sample. The scanning process is therefore relatively slow, and considerable image-processing resources have to be employed to assemble the image strips into the final contiguous digital image.

The process described in WO 01/84209 could be considerably improved if the entire sample could be scanned as a single image strip. Linear optical detectors having CCD arrays of over ten thousand pixels in a single line are available, so in theory it should be possible to generate a scanned image at a resolution of approximately 1 μm of a sample having a width of approximately 20 mm. However, achieving microscopic resolution across such a wide field of view is extremely difficult, as relatively high numerical aperture optics must be used and the aberrations in such systems increase very rapidly for off axis points in the field.

It is an object of the present invention to provide a microscopic imaging system that mitigates at least some of the aforesaid problems.

According to the present invention there is provided a microscopic imaging system including a receiving means for receiving an article to be imaged, a linear optical detector, focussing means for focussing an image of an article in the receiving means onto the detector, scanning means for producing relative movement between the image and the detector in a direction substantially perpendicular to the axis of the detector, and an optical correcting element for reducing aberrations in the image focussed onto the detector.

By using a linear detector and scanning the article in a direction perpendicular to the axis of the detector, it is possible to build up a detailed two-dimensional image of the entire article having many times more pixels than the number of individual detector elements. The use of very expensive 2-dimensional detector arrays is thus avoided. Further, the use of a correcting element to reduce aberrations in the image makes it possible to capture a microscopic image with a very wide field of view, allowing a relatively large article to be scanned at a high resolution in a single operation.

For example, by using the invention it is possible to capture in a single operation an image of a sample slide having dimensions of approximately 2 cm×4 cm, at a resolution of about 1 micron. That image can be stored and transferred electronically, and selected portions of the image can be easily viewed at different magnifications using a conventional computer. In the case of pathology, this offers many advantages, including making diagnosis much easier, allowing a second opinion to be sought, reducing the need for skilled technicians and improving record keeping.

The purpose of the correcting element is to compensate for off-axis aberrations in the rest of the optical system of the imaging device. The form and shape of the correcting element is therefore determined by the type and magnitude of the residual aberrations. In general, such aberrations may be rather complex and it may not be possible to compensate fully for them using just a single correcting element. In high-numerical-aperture wide-field imaging systems aberrations are usually dominated by astigmatism and curvature of field. In this case it is possible to construct a correcting element in the form of an astigmatic cylindrical lens, which compensates for these aberrations over a narrow stripe extending from the axis of the optical system to its edge, which fully covers the field of view of the linear detector.

The correcting element can be described generally in geometric terms as a slab of material with a refractive index n>1, which is bound by two biconic surfaces (i.e. surfaces that form conic sections in the x and y planes). These sections will have, in general, different curvatures and conic constants. In practice the sections are likely to be restricted to parabolic or circular; in the latter case the surface in question can be described simply as having two different curvatures in the x and y directions, akin to an astigmatic lens. However, the crucial difference between the correcting element described here and a simple astigmatic lens is that in this case the magnitude and sign of the astigmatism are allowed to vary along one coordinate, in this case y. This enables the correction of the axial position of both the tangential (x plane) and sagittal (y plane) foci independently and over the whole field of view of the linear detector.

Therefore, in one preferred embodiment of the invention the optical correcting element is astigmatic. Advantageously, the dioptric power of the optical correcting element in the sagittal and tangential directions is defined by the functions $D_x = f(y)$ and $D_y = g(y)$ where $D_x$ and $D_y$ are the dioptric powers of the element in the x and y directions respectively, and $f(y)$ and $g(y)$ are general functions of y. For example, the dioptric power of the correcting element in the x direction may be defined by the function $$D_x = -\frac{Ay^2}{B - Cy^2},$$

where A, B and C are coefficients. In a particularly preferred embodiment, the dioptric power of the optical correcting element is defined by the functions $$Dx = -\frac{0.486y^2}{10 - 0.00486y^2}$$

and $D_y = 0$ where y is measured in millimeters.

A further variation of the design of the correcting element is to male one of its surfaces flat. In a preferred embodiment, this correcting element has only one curved surface defined as $h = My^2x^2 + Ny^2$ where h is the nominal height of the surface in the direction of the optic (z) axis and M and N are curvature coefficients. The first term in this equation is responsible for introducing the shift in tangential focus, whereas the second term flattens the sagittal focus. In the case when the tangential focus is sufficiently flat that extra correction is not required, the second term can be set to zero. In a particularly preferred embodiment the surface is defined as $h = 10^{-4}y^2x^2$, where all distances are measured in mm.

The correcting element may be located between the focussing means and the detector, and is preferably located adjacent to the detector. Alternatively, the correcting element may be located adjacent to the sample.

The scanning means is preferably constructed and arranged to move the receiving means relative to the detector.

The detector may comprise a linear CCD array, and may be capable of capturing an image having a width of at least 2000 pixels, and preferably at least 10000 pixels.

The system may be capable of capturing in a single scanning operation an image of an article having a width of between 1 cm and 4 cm, and preferably approximately 2 cm. The system may be capable of capturing an image of an article having are solution of 0.5-5.0 microns, preferably approximately 1 micron.

The microscopic imaging system may include a data processing device that is constructed and arranged to generate a 2-dimensional image of the article by assembling a plurality of line images captured by the detector. The data processing device may be capable of generating an image of an article having a size of at least $4 \times 10^6$ pixels, preferably at least $4 \times 10^7$ pixels and more preferably approximately $4 \times 10^8$ pixels.

The microscopic imaging system may include means for viewing an image captured by the system, and may include control means for selecting portions of an image to be viewed and controlling the scale of the selected portions.

An embodiment of the invention will now be described, by way of example, with reference to the accompanying drawings, in which.

Figure 1:
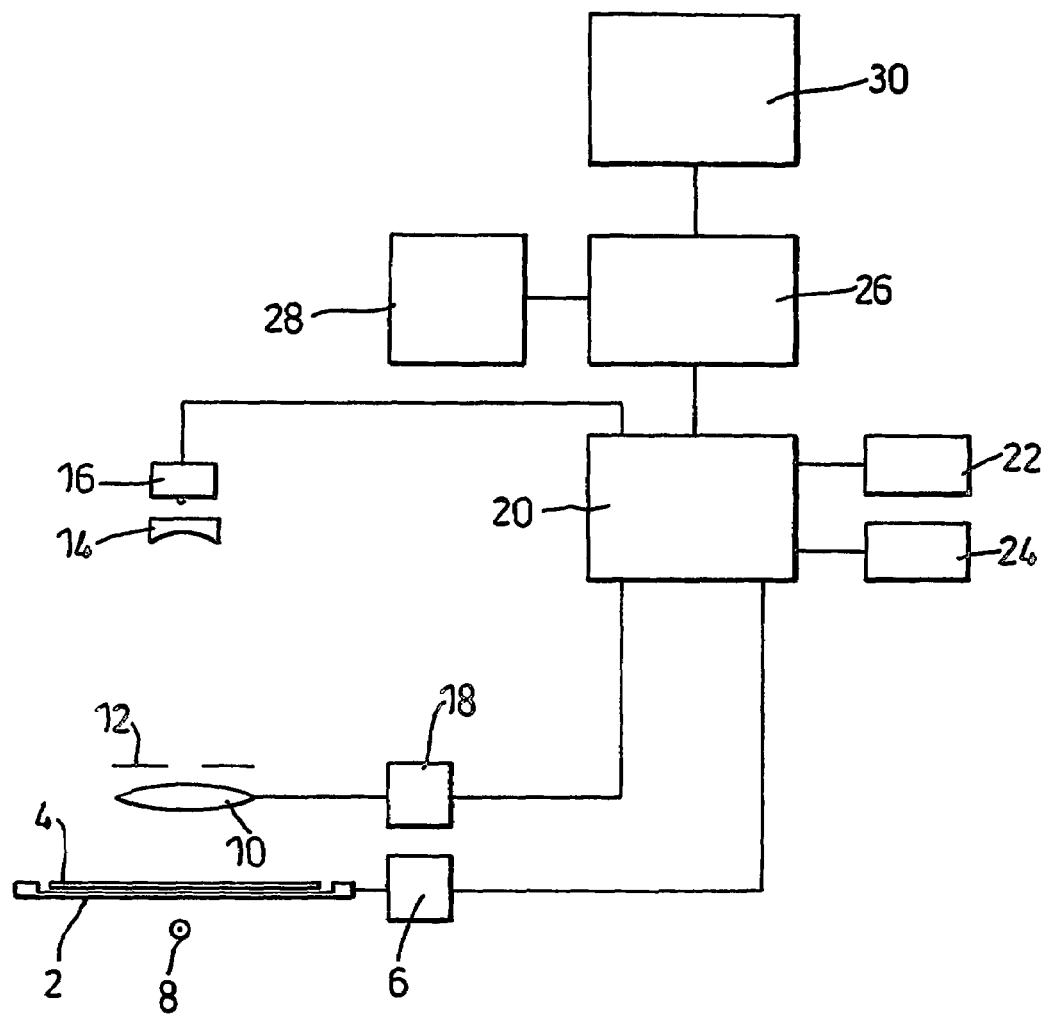
FIG. 1 is a block diagram showing the main components of a microscopic imaging system according to an embodiment of the invention.

The microscopic imaging system includes, as shown in FIG. 1, both optical and electronic components. The optical system includes a sample holder 2 which, in use, carries a prepared sample 4 such as a tissue sample on a microscope slide. The sample might typically have a length of 4 cm and a width of approximately 2 cm. The sample holder is mounted for movement from side-to-side (in the direction of the longitudinal axis of the sample) under the control of a stage motor 6. A linear light source 8 is mounted beneath the sample holder 2 with its axis perpendicular to the longitudinal axis of the sample, to illuminate the sample.

A lens system 10 (for example including a microscope objective) is mounted above the sample 4, and focusses an image of the sample through an aperture 12 and a correcting element 14 onto a linear detector 16, which is mounted with its axis perpendicular to the longitudinal axis of the sample. The detector 16 may for example comprise a linear charge coupled device (CCD) array. The lens system 10 may be of a fixed focus type to avoid any need for focussing or, optionally, the focus of the lens system 10 may be adjustable, for example by a focussing control motor 18. The focussing control motor 18 (if provided) and the stage motor 6 are connected to a data processor 20, which controls operation of those motors.

The linear detector 16 is also connected to the data processor 20, which in turn is connected to a memory 22 and a data store 24 (for example a disk drive), for storing commands and images captured by the system. The data processor 20 is also connected to a computer 26 having an input device 28 (e.g. a keyboard and/or a mouse) for controlling the system and a monitor 30 for viewing images captured by the system. The computer may be connected in a conventional manner to a network, a data link or the Internet.

Figure 2:
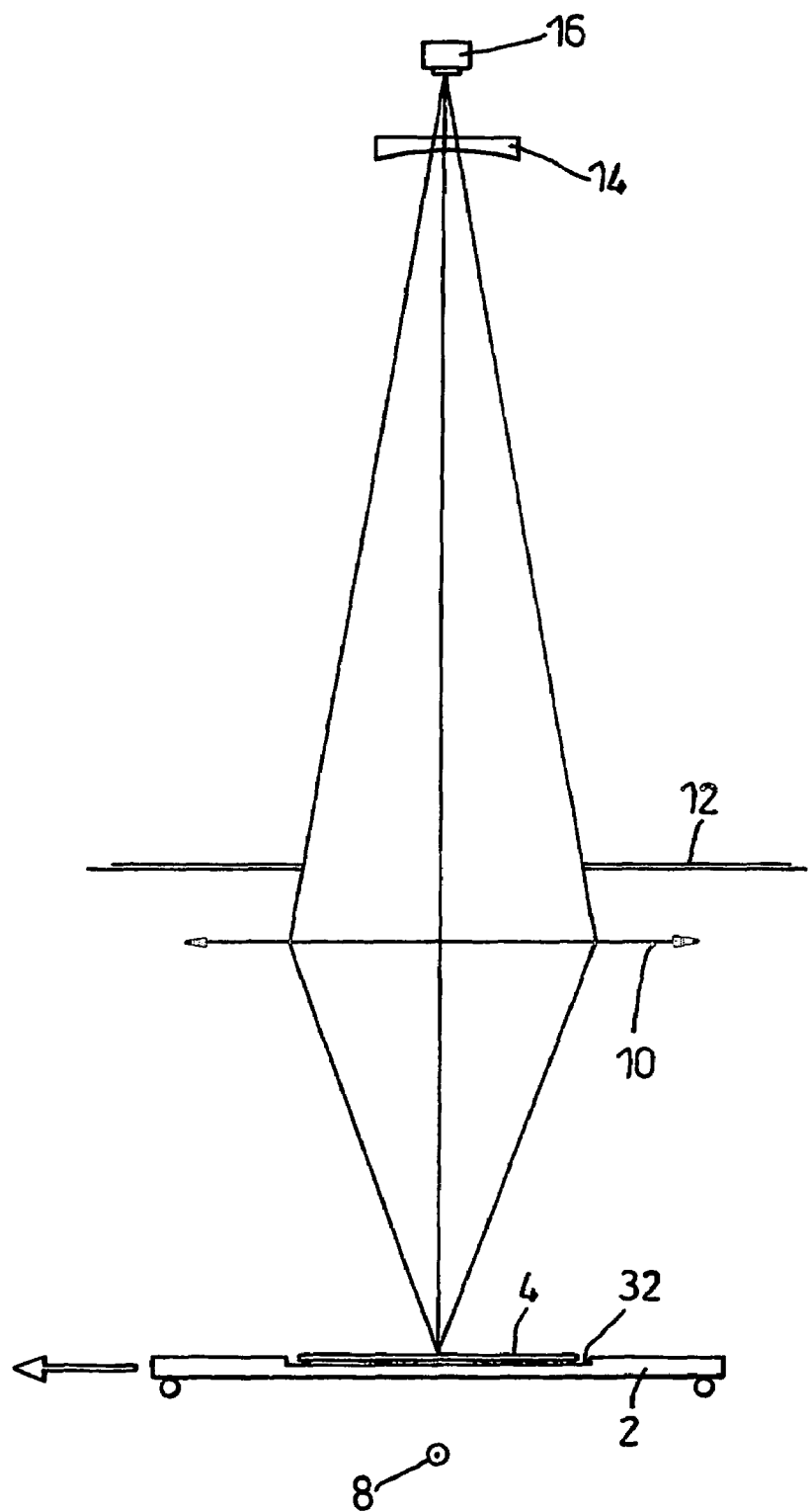
FIG. 2 is a schematic side view showing the main optical components of the microscopic imaging system.
Figure 3:
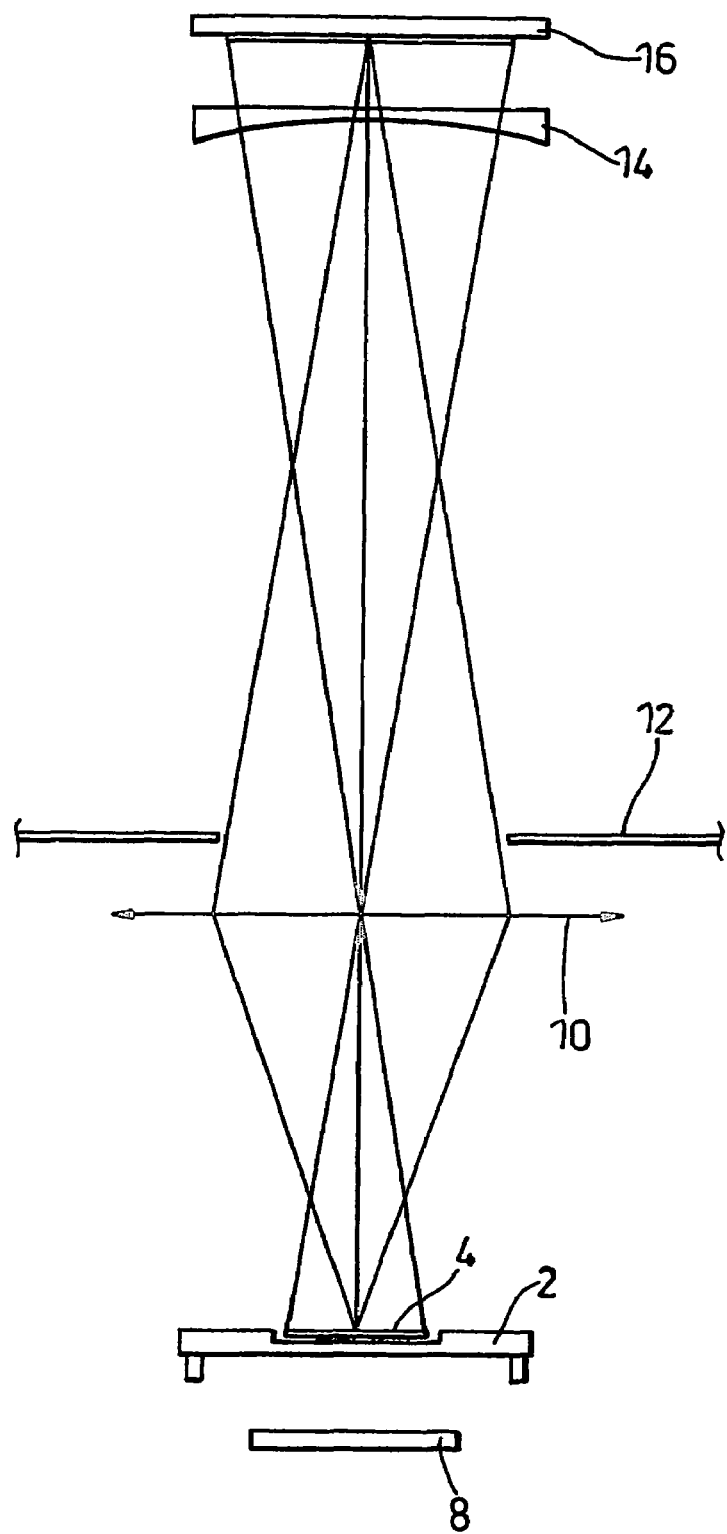
FIG. 3 is a schematic side view in a direction perpendicular to that of FIG. 2, showing the main optical components of the system.
Figure 4:
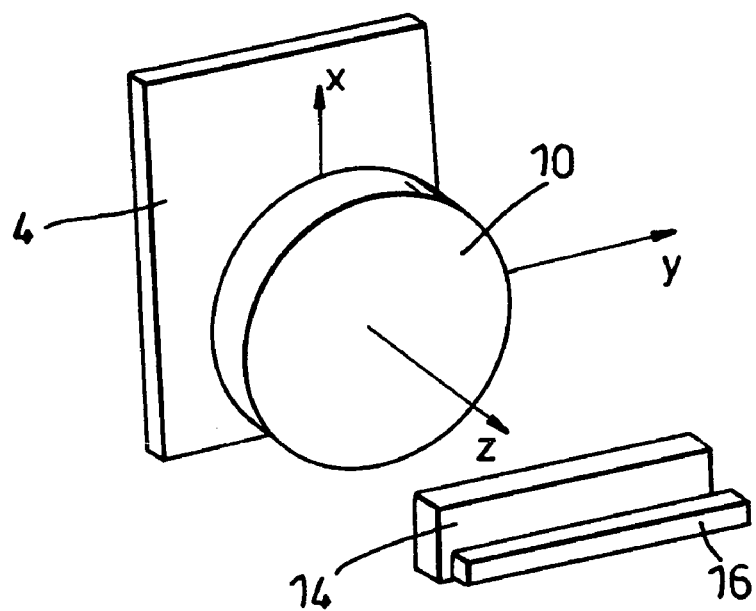
FIG. 4 is an isometric view illustrating schematically some of the main optical components of the system.

The optical arrangement of the optical components of the system is shown more clearly in FIGS. 2, 3 and 4. FIG. 2 is a side view looking in a direction perpendicular to the longitudinal axis of the sample, and FIG. 3 is a side view in the orthogonal direction (parallel to the longitudinal axis of the sample).

The sample holder 2 includes a seat 32 for receiving a conventional sample slide and locating it in the focal plane of the lens system 10 (here represented as a single lens), so that an image of the sample is produced in the plane of the detector 16. In a fixed focus system, this avoids any need for the focus of the lens system to be adjusted. However, if fine adjustment of the focus is required, a servo-motor may be provided for this purpose, which may if required be controlled by an automatic focussing system. The sample holder 2 is mounted for movement in the direction of the longitudinal axis of the sample, movement of the sample holder being controlled by the stage motor 6.

The light source 8 is mounted behind the sample holder 2, to illuminate the sample 4 by transmitted light. The light source 8 is linear and extends across the full width of the sample 4 in a direction perpendicular to its longitudinal axis.

The lens system 10 has a focal length of approximately 40 mm and is positioned approximately 30 mm from the sample, with the linear CCD detector array 16 located in the back focal plane, approximately 60 mm behind the lens. This produces a magnification of ×2 in the plane of the detector. The lens system 10 has a relatively high numerical aperture, for example between 0.2 and 0.5, producing a wide field of view and a shallow depth of field.

An aperture stop 12 is mounted just behind the lens 10, to reduce some of the optical aberrations produced by that lens.

The detector 16 is approximately 40 mm wide and consists of a linear CCD array having a single line of, for example, twenty thousand detector elements. With the two times magnification produced by the lens, the optical system thus has a maximum resolution of approximately 1µm. Alternatively, the linear detector 16 may include three sets of detector elements that are sensitive to light of different wavelengths, to generate a colour image. These three sets of detector elements may be mounted side-by-side on parallel axes: the detector will not then be strictly one-dimensional but will be very narrow having a thickness of only about 6 microns and will serve effectively as a one-dimensional linear detector.

An astigmatic optical correcting element 14 is mounted a few millimeters in front of the detector 16. The correcting element 14 is designed to eliminate curvature of field and astigmatic aberrations produced by the lens, for the narrow line image falling on the array 16. Since the linear detector 16 is one dimensional, the design of the correcting element 14 can be optimised to correct aberrations just along the axis of the detector.

Figure 5:
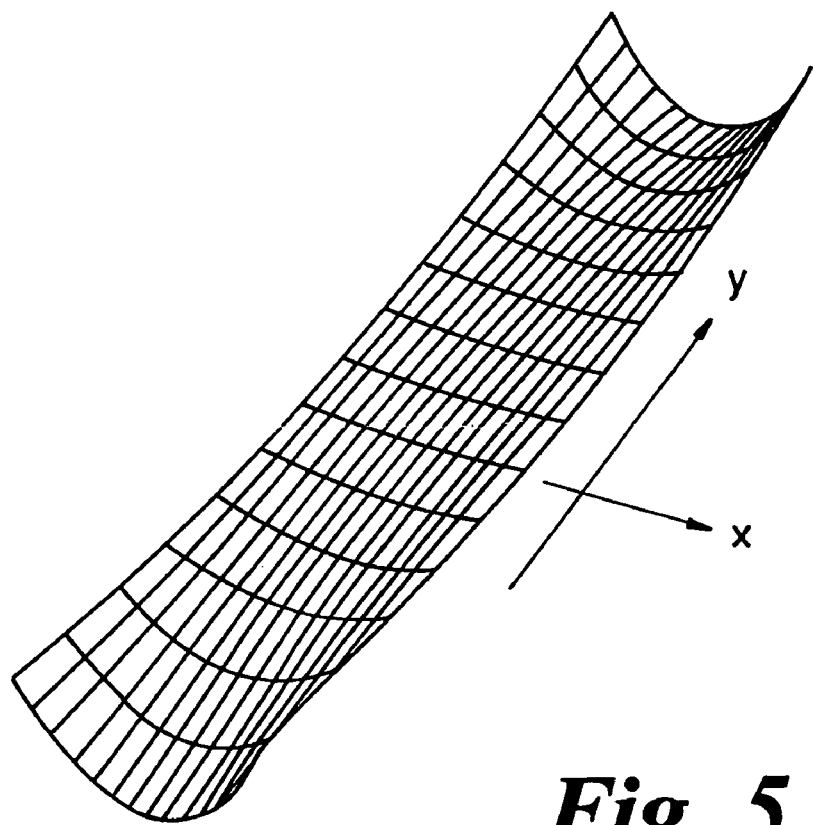
FIG. 5 is an isometric view of an optical correcting element, showing a typical surface shape for that element.

The surface shape of a typical correcting element 14 is shown diagrammatically in FIG. 5, together with three orthogonal reference axes represented by the letters x, y and z. The element 14 lies in the x-y plane, which is perpendicular to the optical axis of the system, represented by the z-axis. The x- and y- axes represent respectively the tangential and sagittal directions of the astigmatic correcting element 14.

For the surface shown, the longitudinal axis of the imaged stripe lies in the y direction and scanning is performed in the x direction. In this example, the surface has an analytical form of $h=Ay^2x^2-By^2$, where h is the nominal height of the surface in the direction of the z-axis, and A and B are coefficients having values of 25 and 0.5 respectively. The second term of the equation ($By^2$) corrects the sagittal focus (parallel to the y direction), while the first term ($Ay^2x^2$) flattens the tangential focus (parallel to the x direction), dependent on the field of position. The form of this equation and its coefficients can be adapted to the properties of the main imaging element in the system.

In operation, a sample slide 4 is placed in the sample holder 2 and, if necessary, the focus of the lens 10 is adjusted. The sample 4 is then scanned by actuating the stage motor 6 to drive the sample 4 in the direction of its longitudinal axis whilst simultaneously capturing an image of the sample 4 by recording a series of line images, as detected by the linear CCD array 14. Typically, for a sample that is 2 cm wide and 4 cm long, 40000 line images will be captured, each comprising 20000 pixels, giving a maximum resolution in both orthogonal directions of 1 micron.

Figure 6:
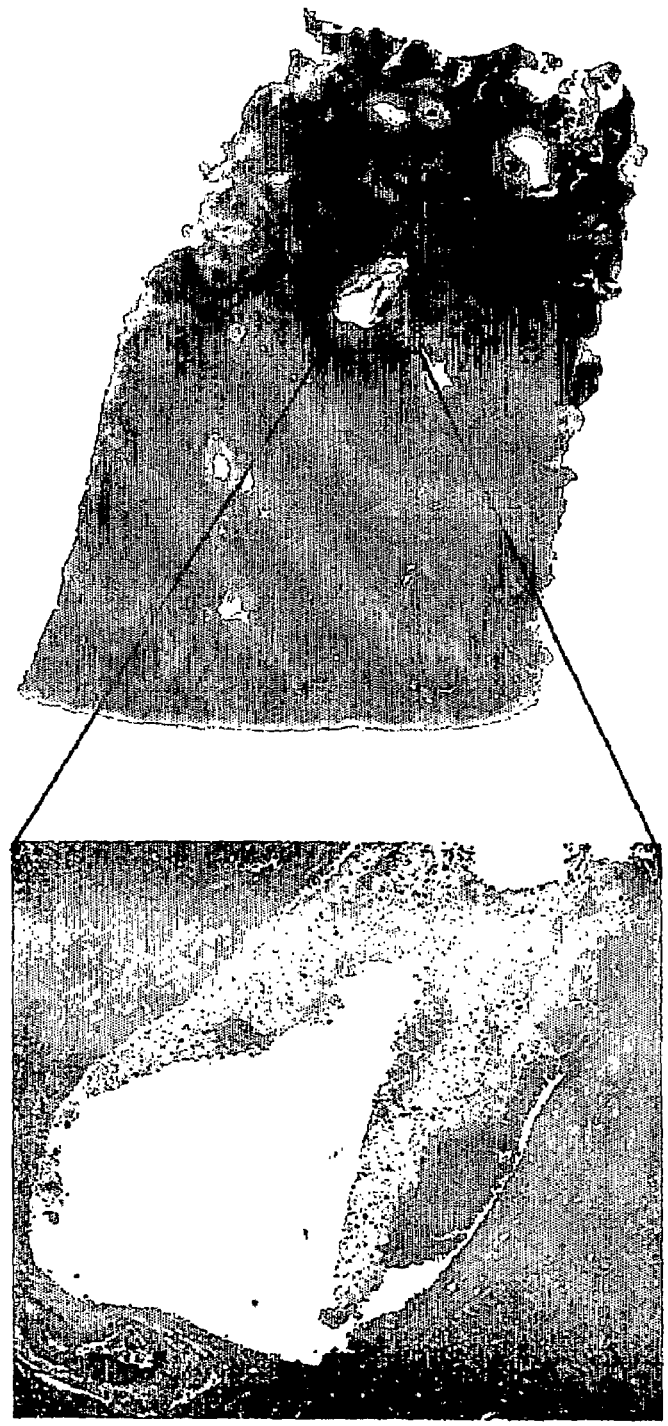
FIG. 6 is a scanned image showing a complete histological section and a portion thereof at a larger magnification.

The line images are then assembled to form a single contiguous image of $8\times10^8$ pixels, which can be viewed on the computer monitor 30 either as a whole or in part at numerous different levels of magnification. An example of a scanned image obtained using the invention, comprising a complete histological section and a portion thereof at a larger magnification, is shown in FIG. 6. The image can also be stored and transmitted electronically, allowing it to be viewed readily at remote locations. Furthermore, the image can be processed electronically to reveal information that is not normally apparent to the eye, and it can be analyzed electronically.

The system of the present invention is thus capable of capturing in a single scan an image at a resolution of about one micron of a sample having a width of 1 cm or more. This is possible owing to the provision of the correcting element, which corrects field curvature and astigmatism over the very wide field of the lens system, and the use of a linear detector, which allows the design of the correcting element to be greatly simplified. The system is therefore relatively inexpensive, allowing widespread application. The system can also be automated, allowing images to be scanned by an unskilled technician for subsequent analysis.

The astigmatic correcting element 14 is designed to minimise field curvature and astigmatism in the line image that is focussed onto the linear detector 16. Generally, the correcting element 14 will include at least one non-spherical surface, and the dioptric power of the element in the x and y directions will be defined by the functions $D_x=f(y)$ and $D_y=g(y)$ where $D_x$ and $D_y$ are the dioptric powers of the element in the x and y directions respectively, and f(y) and g(y) are general functions of y.

The profile may however take various different forms, an example of which will now be described.

EXAMPLE

The correcting element has a planar rear surface and a curved front surface. The dioptric power of the optical correcting element is defined by the functions $$Dx = -\frac{0.486y^2}{10 - 0.00486y^2}$$

and $D_y=0$.

The correcting element has a length of 40 mm (y=±20 mm) and a width of 10 mm (x=±5 mm). The dioptric power of the correcting element in the y direction therefore decreases from 0 along the central axis of the element (at y=0) to −1.38 at the edge of the element (at y=5 mm).

Various modifications of the system are of course possible. For example, instead of moving the sample past stationary optics, the sample may be held in a fixed position and scanned by moving either the whole optical system or a component of the optical system. Instead of using refractive elements for the lens system and the correcting element, equivalent reflective elements (e.g. mirrors) may be employed. The linear detector may comprise a CCD array as described above or it may consist of some other suitable type of detector. The system maybe of a fixed focus type, or it may include a focus adjusting mechanism, which may be manually or automatically controlled. Alternatively, an extended depth of field system may be employed. The system may be designed to operate at visible, infra red or ultra violet wavelengths. The correcting element 14 may be planar on one surface (which may be the front or rear face of the element) and non-planar on the other surface, or both surfaces may be non-planar. Alternatively, a multi-element correcting system may be provided. Although it is preferred that the correcting element is located adjacent to the detector 16, it could be located elsewhere, for example close to the sample plane.

The system may also be used in various different applications, as well as for imaging pathology slides.

What is claimed is:

1. A microscopic imaging system comprising a receiving means for receiving an article to be imaged, a linear optical detector having a linear array of at least 2,000 pixels that extends in a first direction y, focussing means for focussing an image of an article in the receiving means onto the detector, scanning means for producing relative movement between the image and the detector in a second direction x that is substantially perpendicular to the first direction y, and an optical correcting element for reducing aberrations in the image focussed onto the detector, wherein the optical correcting element is astigmatic, and the dioptric power of the optical correcting element in the sagittal and tangential directions is defined by the functions $D_x = -Ay^2/(B-Cy^2)$ and $D_y = g(y)$, wherein $D_x$ and $D_y$ are the dioptric powers of the optical correcting element in the x and y directions, respectively; A, B, and C are coefficients. wherein B and C are not both zero; and g(y) is the general function of y.

2. A microscopic imaging system according to claim 1, in which the dioptric power of the optical correcting element is defined by the functions:

$$Dx = -\frac{0.486y^2}{10 - 0.00486y^2} \text{ and } D_y = 0.$$

3. A microscopic imaging system according to claim 1, wherein the correcting element comprises one planar face and one curved face, wherein the shape of the curved face is defined by the function $h = My^2x^2 + Nx^2$ where h is the nominal height of the surface in the direction of the optic axis and M and N are coefficients.

4. A microscopic imaging system according to claim 3, wherein the shape of the curved face is defined by the function $h = 10^{-4} y^2 x^2$.

5. A microscopic imaging system according to claim 1, wherein the correcting element is located between the focussing means and the detector.

6. A microscopic imaging system according to claim 5, wherein the correcting element is located adjacent the detector.

7. A microscopic imaging system according to claim 1, wherein the correcting element is located between the focussing means and the receiving means.

8. A microscopic imaging system according to claim 7, wherein the correcting element is located adjacent the receiving means.

9. A microscopic imaging system according to claim 1, wherein the scanning means is constructed and arranged to move the receiving means relative to the detector.

10. A microscopic imaging system according to claim 1, wherein the detector comprises a linear CCD array.

11. A microscopic imaging system according to claim 1, the system being capable of capturing in a single scanning operation an image of an article having a width of between 1 cm and 4 cm.

12. A microscopic imaging system according to claim 11, the system being capable of capturing in a single scanning operation an image of an article having a width of approximately 2 cm.

13. A microscopic imaging system according to claim 1, the system having a resolution of 0.5-5.0 microns.

14. A microscopic imaging system according to claim 13, the system having a resolution of approximately 1 micron.

15. A microscopic imaging system according to claim 1, further comprising a data processing device that is constructed and arranged to generate a 2-dimensional image of the article by assembling a plurality of line images captured by the detector.

16. A microscopic imaging system according to claim 15, wherein the data processing device is capable of generating an image of an article having at least $4 \times 10^6$ pixels.

17. A microscopic imaging system according to claim 16, wherein the data processing device is capable of generating an image having at least $4 \times 10^7$ pixels.

18. A microscopic imaging system according to claim 17, wherein the data processing device is capable of generating an image having approximately $4 \times 10^8$ pixels.

19. A microscopic imaging system according to claim 1, further comprising means for viewing an image captured by the system.

20. A microscopic imaging system according to claim 19, further comprising control means for selecting portions of an image to be viewed and controlling the scale of the selected portions.

21. A microscopic imaging system according to claim 1, wherein the detector is capable of capturing an image having at least 10000 pixels.

* * * * *

UNITED STATES PATENT AND TRADEMARK OFFICE
CERTIFICATE OF CORRECTION

PATENT NO. : 7,476,831 B2 Page 1 of 1
APPLICATION NO. : 10/546845
DATED : January 13, 2009
INVENTOR(S) : Rimvydas Juskaitis, Mark Neil and Tony Wilson It is certified that error appears in the above-identified patent and that said Letters Patent is hereby corrected as shown below:

Title Page 1, Item (75), Inventors, Line 1, Change "Cuttleslowe" for Rimvydas Juskaitis to --Cutteslowe--.

Column 3, Line 37, Change "male" to --make--.

Column 3, Line 61, Change "are solution" to --a resolution--.

Column 6, Line 65, Change "maybe" to --may be--.

Column 7, Line 29, In Claim 1, change "coefficients." to --coefficients,--.

Signed and Sealed this

Twenty-second Day of September, 2009

David J. Kappos
*Director of the United States Patent and Trademark Office*